United States Patent Office 3,363,019
Patented Jan. 9, 1968

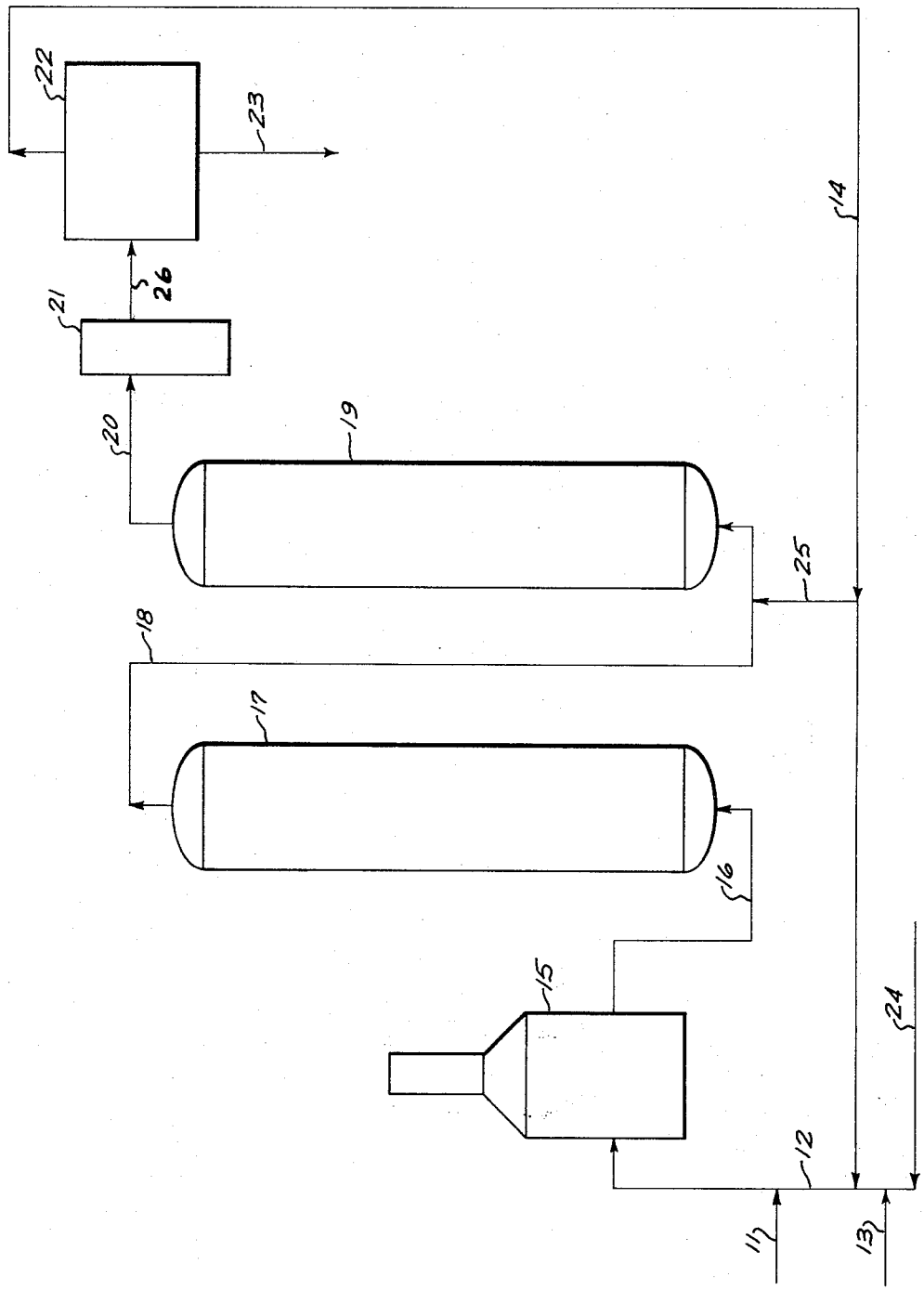

3,363,019
THERMAL HYDRODEALKYLATION WITH LARGE RECYCLE FOR HEAT SINK
Norman L. Carr and Sheldon J. Kramer, Pittsburgh, and Donald L. Stahlfeld, Glenshaw, Pa., assignors to Gulf Research & Development Company, Pittsburgh, Pa., a corporation of Delaware
Filed Sept. 27, 1966, Ser. No. 582,431
8 Claims. (Cl. 260—672)

ABSTRACT OF THE DISCLOSURE

Alkyl aromatic hydrocarbon feedstocks containing heavy paraffinic materials are subjected to thermal hydrodealkylation in the presence of a hydrodealkylation effluent recycle stream comprising hydrogen and low molecular weight gaseous hydrocarbons. The recycle stream containing from 35 to 70 mol percent hydrogen provides a "heat sink" for the exothermic heat of reaction of the heavy paraffins.

---

This invention relates to a process for the thermal hydrodealkylation of alkyl benzene compounds. More particularly, this invention relates to such a process wherein the hydrocarbon feed to the thermal hydrodealkylation system contains a significant amount of heavy paraffin impurities.

Toluene can be dealkylated to benzene by subjecting it in the presence of hydrogen to an elevated temperature and elevated pressure for a controlled length of time. As a result of such reaction conditions, the methyl group is cleaved from the toluene and replaced by hydrogen. The mechanism probably involves the generation of methyl and phenyl radicals and the combination of these with hydrogen to form methane and benzene. The overall hydrodealkylation reaction is highly exothermic.

The presence of heavy paraffins in the feed to a thermal hydrodealkylation reactor causes excessive generation of heat in the reactor due to the extremely high exothermic nature of the hydrogenolysis or hydrocracking of these heavy paraffins. This causes the reactor to become difficult to operate and control. The excessive temperatures caused by the presence of the heavy paraffins in the thermal hydrodealkylation reactor renders the thermal hydrodealkylation process very sensitive to fluctuations in temperatures and flow rates of the feed to the reactor. That is, a slight increase in the feed temperature and/or a slight decrease in the flow rate of the feed to the reactor results in significant increases in the temperature of the effluent from the reactor.

For the foregoing reasons, heavy paraffins are normally removed from a hydrocarbon feed stock, such as by solvent extraction, before it is introduced into a thermal hydrodealkylation reactor. However, the investment and operating costs of removing heavy paraffin impurities to produce an essentially pure toluene or toluene and benzene feed are such that it would be economically desirable to be able to efficiently operate a thermal hydrodealkylation process utilizing a feed containing significant amounts of heavy paraffins.

It is an object of this invention to provide an improved thermal hydrodealkylation process.

It is another object of this invention to provide a process for the thermal hydrodealkylation of a hydrocarbon feed containing significant amounts of heavy paraffin impurities.

It is a further object of this invention to provide such a process which results in increased benzene selectivity and which is less sensitive to fluctuations in temperatures and flow rates of the feed to the thermal hydrodealkylation reactor.

These and other objects are attained by the practice of this invention which, briefly comprises subjecting a gaseous mixture comprising at least one alkyl benzene, at least one heavy paraffin (i.e., one containing from 6 to 12 carbon atoms) and hydrogen in a first reaction zone to a reaction temperature of from about 1000 to 1500° F. The effluent from the first reaction zone is then passed to a second reaction zone wherein it is subjected to a reaction temperature of from about 1000 to 1500° F. The effluent from the second reaction zone is passed to a high pressure separator wherein it is separated under high pressure into a liquid phase and a gaseous phase. The gaseous phase from the high pressure separator, comprising primarily methane and hydrogen, is recycled to and combined with the gaseous mixture feed to the first reactor in an amount sufficient to give a hydrogen to aromatic hydrocarbon mol ratio within the range of from about 4 to 20 and to give a total reactor feed which comprises from about 35 to 70 percent by weight recycle gas. The liquid phase from the high pressure separator, comprising primarily benzene, is further processed to recover the desired hydrodealkylated product therefrom by known techniques.

The invention will be further illustrated with reference to the accompanying drawing.

Referring to the drawing, the hydrocarbon feed stock is fed into the system by way of line 11. The feed comprises a mixture comprising at least one alkyl benzene and at least one heavy paraffin. The alkyl benzene present in the feed can be, for example, toluene, m-xylene, o-xylene, p-xylene, mixed xylenes, ethylbenzene, propylbenzene, butylbenzene and other $C_9$ and $C_{10}$ alkyl benzenes and mixtures of any of these. The heavy paraffins present in the feed can be, for example, octanes, nonanes, decanes, etc., and mixtures thereof. The hydrocarbon feed may contain up to 12 percent by weight of heavy paraffins and, preferably from 6 to 10 percent by weight. Since the process of this invention is specifically designed to hydrodealkylate feed stocks containing significant amounts of heavy paraffin impurities, the investment and operating costs normally required to produce an essentially pure alkyl benzene are avoided.

The feed is passed by line 11 into line 12. Make-up hydrogen-containing gas at an elevated pressure is introduced to the process through line 13 which communicates with line 12.

Hydrogen containing recycle gas obtained from a high pressure separator more fully described hereinafter is introduced into line 12 by line 14. The recycle hydrogen-containing gas may contain between about 35 and 70 mol percent hydrogen and, preferably, between about 40 and 50 mol percent hydrogen. Sufficient hydrogen-containing gas from the high pressure separator is recycled to give in the feed which is introduced into the first reactor a hydrogen to aromatic hydrocarbon mol ratio within the range of from about 4 to 20 and, preferably, from about 6 to 10, and to give a feed which comprises from 35 to 70 percent by weight and, preferably, from 40 to 60 percent by weight recycle gas. This requires recycling about 5 times as much gas as is normal in a thermal hydrodealkylation system.

The reactant feed stream comprising alkyl benzene, heavy paraffins, make-up hydrogen-containing gas and recycle hydrogen-containing gas may contain a hydrogen to hydrocarbon mol ratio within the range of from about 1 to 10 and, preferably, from about 2 to 5. The reactant feed stream may be preheated in one or more heat exchanges (not shown) wherein heat is supplied by hot effluent from the thermal hydrodealkylation reactors. The reactant stream is passed to heater or furnace 15 wherein final heating of the reactant feed stream up to the reaction temperature is accomplished. The reactor feed stream heated to reaction temperature of about 1135° F. in heater or furnace 15 is then passed by line 16 to the first reactor 17. An effluent at a temperature of about 1200° F. is recovered through the top of the reactor 17 by line 18. The effluent in line 18 is thereafter introduced into the bottom of a second reactor 19.

The thermal hydrodealkylation reaction which occurs in reactors 17 and 19 is conducted at a temperature of from about 1000° to 1500° F. and a pressure of from about 300 to 1000 p.s.i.g. with a contact time or residence time of the reactants in the reactor of from about 10 to 200 seconds. In a preferred embodiment of this invention, the reaction is conducted at a temperature of from about 1100° to 1350° F. and a pressure of from about 400 to 600 p.s.i.g. for from about 30 to 70 seconds.

The large amount of recycle gas which is present in the thermal hydrodealkylation reactors acts as a heat sink to remove the extra heat generated and thereby minimizes fluctuations of temperature in the reaction vessels which would otherwise occur due to the excessive amount of heat released during hydrocracking of the heavy paraffins present. There is thus created a smaller temperature rise across the reactors.

Moreover, the sensitivity of the reactors is reduced to between 2 and 3 by the practice of this invention. Reactor sensitivity is defined as the steady-state change in output temperature for a unit change in input temperature. If the normal amount of recycle gas were employed, the sensitivity of the reactor would be between 20 and 30, the temperature rise through the reactors would be excessive, and the reactors would be uncontrollable.

An effluent is recovered from the top of reactor 19 by line 20. This effluent contains essentially no heavy paraffins to contaminate the benzene product. Moreover, substantially no alkyl benzenes heavier than toluene will be present in the effluent.

The large volume of recycle gas in the feed to the thermal hydrodealkylation reactors results in a larger volume of effluent being removed from the reactor 19 than in conventional thermal hydrodealkylation processes. Since the effluent contains a large quantity of heat, it is advantageous to pass it by line 20 to steam generator 21 or some other heat economizer.

The effluent is then passed from the steam generator 21 by line 26 through a suitable cooler (not shown) to a high pressure separator 22 maintained at a pressure of about 400 p.s.i.g. and a temperature of about 100° F. In the high pressure separator 22, a vaporous stream comprising hydrogen, methane and a small amount of entrained benzene product is separated from a major benzene liquid product stream. At least a portion of the vaporous stream is removed from separator 22 by line 14 and is recycled to the feed for the reactors as previously described. Any portion of the vaporous stream which is not recycled may be further treated to obtain maximum recovery of entrained benzene product material by known techniques.

The liquid stream containing primarily benzene and some unconverted toluene separated in high pressure separator 22 is withdrawn and passed by line 23 to a product purification and recovery section (not shown) wherein the benzene product is purified and recovered. Unconverted toluene is removed from the fractionator and recycled by line 24 to the feed in line 12.

The process of this invention results in benzene selectivities which are from about 1 to 3 mol percent higher than conventional thermal hydrodealkylation processes.

Modifications may be made in the foregoing described process to accommodate specific situations. For example, provision may be made for quenching the effluent in line 18 between reactor 17 and reactor 19 with a portion of the recycle gas from high pressure separator 22. The recycle gas may be introduced into line 18 from line 14 by means of line 25. While an interreactor quench is not required during steady-state operation, it will facilitate control of the thermal hydrodealkylation process in case of malfunction, and provide increased operational flexibility.

In the interest of simplifying the description of this invention to the extent possible, numerous steps which are conventional in a thermal hydrodealkylation process have been omitted. Such steps include operations such as heat exchange between the hot effluent and the feed, cooling of the effluent, stripping, fractionating, etc. A more detailed description of such other oprations is included in copending application Ser. No. 558,993, filed June 20, 1966, the disclosure of which is incorporated herein by reference.

The practice of this invention permits the use of a feed containing heavy paraffin impurities in a thermal hydrodealkylation process. It also results in an improvement in benzene selectivity, less temperature rise through the reactors and less sensitivity of the reactors to fluctuations in the input temperatures and flow rates. Further, large amounts of steam can be generated by indirect heat exchange with the reactor effluent, due to the greater amounts of fired preheating used in this invention.

The following example illustrates this invention:

*Example*

This example employs the process and apparatus illustrated in the drawing and described hereinabove. In one run, a liquid hydrocarbon feed having an aromatic content as set forth in the table below is passed to a thermal hydrodealkylation reactor at a rate of approximately 60,800 pounds per hour. The liquid hydrocarbon feed contains 8.84 percent heavy paraffins. The hydrogen to aromatic mol to mol ratio is 9.77, and 46.1 percent by weight of the total reactor feed is recycle gas. The feed is introduced into a first reactor, having a volume of 2100 cubic feet, at a temperature of 1134° F. An effluent is withdrawn from the first reactor at a temperature of 1197° F. and is introduced into the bottom of a second reactor which also has a volume of 2100 cubic feet. Thus, the total reactor volume is 4200 cubic feet. The thermal hydrodealkylation reaction is conducted at a pressure of 500 p.s.i.g. The effluent from the second reactor is withdrawn at a temperature of 1330° F. This effluent is cooled and separated into a vaporous phase and a liquid phase. The vaporous phase, with a molar composition of 48.5 percent hydrogen, 48.0 percent methane and 3.5 percent ethane, is used as recycle gas to the first reactor and the liquid phase is treated to recover the product benzene. The conversion of aromatics in the feed to benzene is calculated to be 89 percent per pass and the benzene selectivity is determined to be 95 percent.

Table.—*Composition of liquid feed, vol. percent*

| | |
|---|---|
| $C_6$ Aromatics | 0.21 |
| $C_7$ Aromatics | 26.52 |
| $C_8$ Aromatics | 32.78 |
| $C_9$ Aromatics | 28.58 |
| $C_{10}$ Aromatics | 3.17 |
| $C_{8-12}$[1] Paraffins | 8.84 |

[1] Approximate distribution: $C_8$–40%, $C_9$–30%, $C_{10}$–20%, $C_{11}$–7%, $C_{12}$–3%.

For the purposes of comparison, a conventional thermal hydrodealkylation process is conducted under the same operating conditions as described above with the following exceptions: The feed contains 2% mixed $C_{7-9}$ paraffins, a hydrogen to aromatic mol to mol ratio of 5.0, and approximately 18% by weight of the total feed is recycle gas. The feed is introduced into a reactor having a volume of 2600 cubic feet at a temperature of from 1150 to 1200° F. The effluent is withdrawn at a temperature of 1330° F. (i.e., same as in the foregoing example). The conversion of aromatics in the feed is 85% per pass, and the benzene selectivity is 92%.

The amount of recycle gas employed in the feed of the example of this invention is 5.25 times as great as the recycle gas contained in the feed of the comparative example. It will be noted that the process of this invention employing a much larger quantity of recycle gas results in higher conversion and improved selectivity over that obtained by a conventional thermal hydrodealkylation process.

A conventional thermal hydrodealkylation process cannot be compared to the process of this invention with feeds containing more than about 2 percent by weight of heavy paraffins, since a conventional thermal hydrodealkylation process cannot cope with the excessive heat evolved by the hydrocracking of higher amounts of heavier paraffins. Reactor sensitivity increases and so does the temperature rise through the reactors causing the reactors to become uncontrollable.

Obviously, many modifications and variations of the invention as hereinabove set forth can be made without departing from the spirit and scope thereof; and therefore only such limitations should be imposed as are indicated in the appended claims.

We claim:

1. A process for the thermal hydrodealkylation of an alkyl benzene which comprises:
    (a) subjecting a gaseous mixture of at least one alkyl benzene, at least about 2 percent of a heavy paraffin (i.e., one containing from 6 to 12 carbon atoms) and hydrogen in a first reaction zone to a reaction temperature of from about 1000 to 1500° F.;
    (b) passing the effluent from said first reaction zone to a second reaction zone and subjecting said effluent in said second reaction zone to a reaction temperature of from about 1000 to 1500° F.;
    (c) separating the effluent from said second reaction zone under high pressure into a liquid phase and a gaseous phase, said gaseous phase comprising between about 35 and 70 mol percent hydrogen;
    (d) recycling at least a portion of said gaseous phase to the feed to said first reaction zone in an amount sufficient to give a hydrogen to aromatic hydrocarbon mol ratio in said feed within the range of from about 6 to 20 and to give a total reactor feed comprising about 35 to 70 percent by weight of said recycle gas; and
    (e) recovering the hydrodealkylated product from said liquid phase.

2. A process as defined in claim 1 wherein the gaseous phase separated from the second reaction zone effluent comprises between about 40 and 50 mol percent hydrogen.

3. A process as defined in claim 1 wherein said thermal hydrodealkylation reaction is conducted at a pressure of from about 300 to 1000 p.s.i.g. for from about 10 to 200 seconds and the hydrogen to hydrocarbon mol ratio is within the range of from about 1 to 10.

4. A process as defined in claim 1 wherein said thermal hydrodealkylation reaction is conducted at a temperature of from about 1100° to 1350° F. and a pressure of from about 400 to 600 p.s.i.g. for from about 30 to 70 seconds and the hydrogen to aromatics hydrocarbon mol ratio is within the range of from about 6 to 12.

5. A process as defined in claim 1 wherein the heat contained in the effluent from said second reaction zone is used to generate steam before said effluent is separated into a liquid phase and a gaseous phase.

6. A process as defined in claim 1 wherein said heavy paraffin comprises a nonane.

7. A process as defined in claim 1 wherein the feed to said first reaction zone contains from 4 to 12 percent by weight of said heavy paraffin.

8. A process as defined in claim 1 wherein the feed to said first reaction zone contains from about 8 to 12 percent by weight of said heavy paraffin.

References Cited

UNITED STATES PATENTS

| | | | |
|---|---|---|---|
| 3,101,380 | 8/1963 | Hariu | 260—672 |
| 3,198,847 | 8/1965 | Lanning | 260—672 |
| 3,201,488 | 8/1965 | Sherk et al. | 260—672 |
| 3,288,874 | 11/1966 | Boroles | 260—672 |
| 3,288,875 | 11/1966 | Payne et al. | 260—672 |
| 3,322,842 | 5/1967 | Czajkowski et al. | 260—672 |
| 3,188,359 | 6/1965 | Lempert et al. | 260—672 |
| 3,296,323 | 1/1967 | Myers et al. | 260—672 |

DELBERT E. GANTZ, *Primary Examiner.*

G. E. SCHMITKONS, *Assistant Examiner.*